Jan. 14, 1936.   P. M. LEWIS   2,027,540
PNEUMATIC RAILWAY WHEEL
Filed July 20, 1934
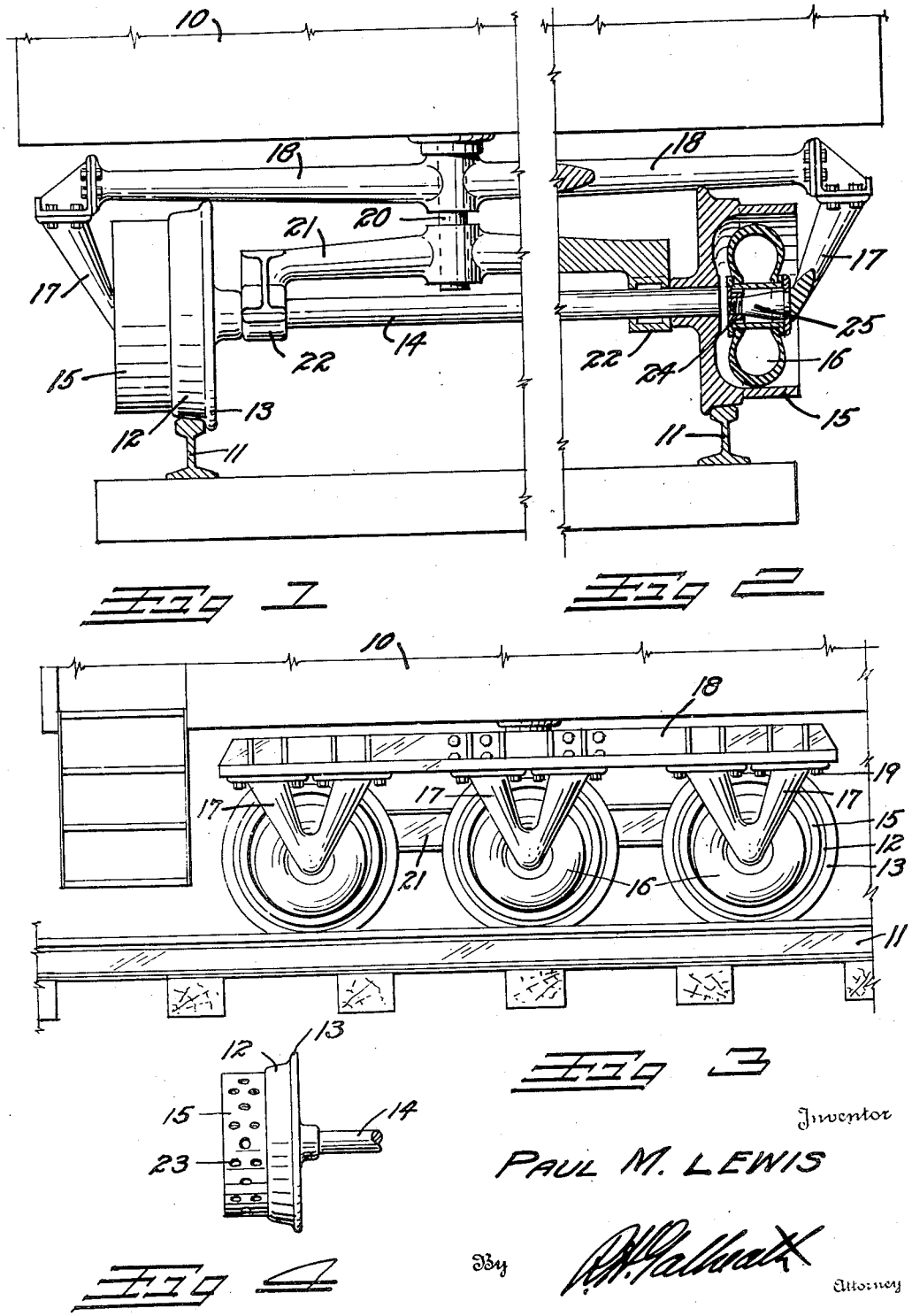

Patented Jan. 14, 1936

2,027,540

UNITED STATES PATENT OFFICE 2,027,540

PNEUMATIC RAILWAY WHEEL

Paul M. Lewis, Denver, Colo.

Application July 20, 1934, Serial No. 736,162

5 Claims. (Cl. 105—182)

This invention relates to a pneumatic wheel for railroad vehicles, and has for its principal object the provision of a wheel structure which will permit pneumatic tires to be used to support a railway carriage without requiring said tires to ride upon the rails so that the tire may have any desired shape or tread without regard to the rail requirements.

Another object of this invention is to provide a wheel structure which will have all the advantages of a pneumatic tire combined with those of a metallic wheel.

A further object of the invention is to so construct the device that all road vibrations will be transmitted through a pneumatic tire, and in which all tractive effort will be exerted through metallic wheels.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a detail end elevation illustrating the invention applied to a railway car.

Fig. 2 is a similar view with the wheel parts shown in section.

Fig. 3 is a side elevation of a railroad truck in which the invention is embodied.

Fig. 4 is a detail view illustrating an alternate form of wheel for use in the invention.

In the drawing a typical railway car is indicated at 10, and a railway track at 11. The invention contemplates the employment of hollow, cup-shaped, metallic wheels having a track tread portion 12 and a retaining flange 13 similar in design to the present railway wheels. The wheels are preferably mounted on the extremities of a common axle 14.

As thus far described the metallic wheels are similar to the usual railway wheels. In applying this invention, however, the wheels are formed with a cylindrical drum 15 extending outwardly therefrom, to provide a smooth internal cylindrical track. Pneumatic tires or wheels 16, of a smaller diameter than the drums 15 ride therewithin upon this cylindrical track. The pneumatic wheels 16 are mounted on the extremities of bearing brackets 17 which extend downwardly on the exterior of the metallic wheels. The brackets 17 are removably secured to a main truck structure 18 by means of suitable attachment bolts 19. The main truck structure 18 is pivoted upon a king post 20 extending downwardly from the car 10.

The axles 14 are tied together by means of a sub-truck 21 which is slidably pivoted upon the king post 20. Any vertical vibration of the metallic wheels will cause the sub-truck 21 to vibrate vertically on the post 20 without transmitting the vibrations to the car 10. The weight of the car is carried entirely on the main truck 18 and from there to the pneumatic wheels 16, the sub-truck supporting only its own weight. Tractive effort on the car will be transmitted through the king post 20 to both trucks so that they will move in unison.

This structure provides a continuous, smooth roadway for the pneumatic wheels 16, regardless of the condition of the track 11. It also provides a resilient support which reduces the necessity for springs, and the spring supporting structures, thereby greatly reducing the truck weight, and the overhead height; and also providing a quiet, vibrationless supporting carriage. The pneumatic wheels or tires can be easily removed or replaced by simply removing the bracket bolts 19. Owing to the smooth contact surface, however, they will not require frequent replacement.

Should one of the pneumatic wheels become deflated, the remainder of the wheels will support the weight until replacement can be made. Should all of the wheels become deflated, it will allow the main truck 18 to rest upon the sub-truck 21 without damage to the car or equipment.

In Fig. 4, one of the metallic wheels is illustrated with perforations 23 therein. Such a wheel might be advantageous to eliminate air compression or suction between the pneumatic wheel and its metallic riding surface.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A pneumatic wheel structure for a railway car comprising: a series of pairs of metallic track wheels; a series of axles, each axle connecting a pair of said wheels; an outwardly extending cylindrical drum on each of said wheels; a main truck structure positioned above said wheels;

brackets extending downwardly from said truck structure opposite said wheels; and pneumatic tires journalled on said brackets so as to ride within the cylindrical drums of said wheels; and a sub-truck structure connecting said axles.

2. A pneumatic wheel structure for a railway car comprising: a series of pairs of metallic track wheels; a series of axles, each axle connecting a pair of said wheels; an outwardly extending cylindrical drum on each of said wheels; a main truck structure positioned above said wheels; brackets extending downwardly from said truck structure opposite said wheels; pneumatic tires journalled on said brackets so as to ride within the cylindrical drums of said wheels; and a sub-truck structure connecting said axles, said main truck structure and said sub-truck structure being pivoted at a common point.

3. A pneumatic wheel structure for a railway car comprising: a series of pairs of metallic track wheels; a series of axles, each axle connecting a pair of said wheels; an outwardly extending cylindrical drum on each of said wheels; a main truck structure positioned above said wheels; brackets extending downwardly from said truck structure opposite said wheels; pneumatic tires journalled on said brackets so as to ride within the cylindrical drums of said wheels; a king post extending downwardly from said car, said main truck being pivoted on said post; and a sub-truck connecting said axles, said sub-truck being also pivoted on said post so that it may move vertically thereon.

4. A pneumatic wheel structure for a railway car comprising: a series of axles; track wheels formed on the extremities of each of said axles; a hollow cylindrical drum concentrically formed on the outer face of each of said wheels; smaller wheels positioned within said drum and riding in the bottom thereof; a first truck structure connecting said axles; and a second truck structure connecting said smaller wheels.

5. A pneumatic wheel structure for a railway car comprising: a series of axles; track wheels formed on the extremities of each of said axles; a hollow cylindrical drum concentrically formed on the outer face of each of said wheels; smaller wheels positioned within said drum and riding in the bottom thereof; a first truck structure connecting said axles; a second truck structure connecting said smaller wheels; and means for preventing longitudinal relative movement between said truck structures.

PAUL M. LEWIS.